(12) United States Patent
Wong et al.

(10) Patent No.: US 7,949,437 B2
(45) Date of Patent: May 24, 2011

(54) OMNIDIRECTIONAL MOVEMENT CONTROL SYSTEM

(75) Inventors: Ching-Chang Wong, Taipei (TW);
Chih-Cheng Liu, Danshuei Township (TW); Yang-Han Lee, Danshuei Township (TW); Shih-An Li, Danshuei Township (TW); Hou-Yi Wang, Danshuei Township (TW)

(73) Assignee: Tamkang University (TW)

( * ) Notice: Subject to any disclaimer, the term of this patent is extended or adjusted under 35 U.S.C. 154(b) by 1107 days.

(21) Appl. No.: 11/684,699

(22) Filed: Mar. 12, 2007

(65) Prior Publication Data
US 2008/0228328 A1    Sep. 18, 2008

(51) Int. Cl.
*B62D 7/08* (2006.01)

(52) U.S. Cl. .............................................. 701/1; 180/21

(58) Field of Classification Search .. 701/1; 180/21–23, 180/12–15, 234–236, 252–253, 24.06–24.08; 301/5.1, 5.22, 6.5
See application file for complete search history.

(56) References Cited

U.S. PATENT DOCUMENTS

| | | | | |
|---|---|---|---|---|
| 4,683,973 A * | 8/1987 | Honjo et al. | .................. | 180/252 |
| 5,323,867 A * | 6/1994 | Griffin et al. | .................... | 180/22 |
| 6,408,230 B2 * | 6/2002 | Wada | .............................. | 701/1 |
| 6,810,976 B2 * | 11/2004 | Rohrs | ............................. | 180/22 |
| 7,316,288 B1 * | 1/2008 | Bennett et al. | ................ | 180/413 |

* cited by examiner

*Primary Examiner* — Dalena Tran
(74) *Attorney, Agent, or Firm* — Schmeiser, Olsen & Watts, LLP

(57) ABSTRACT

The present invention discloses an omnidirectional movement control system, having a move signal generator for generating a plurality of movement signals based on a plurality of first position signals and a plurality of second position signals, and an omnidirectional movement controller for generating a plurality of pulse width modulation signals and a plurality of motor direction change signals based on the movement signals and a plurality of motor encoding disc signals, and a driving circuit for driving motors to rotate a plurality of omnidirectional wheels based on the pulse width modulation signals and the motor direction change signals, such that a mobile platform can be moved in any direction and rotated in different directions, so as to provide excellent mobility and flexibility to the mobile platform.

16 Claims, 8 Drawing Sheets

OMNIDIRECTIONAL MOVEMENT CONTROL SYSTEM

FIELD OF THE INVENTION

The present invention relates to an omnidirectional movement control system, and more particularly to a system that uses an omnidirectional movement controller and a mobile platform having omnidirectional wheels to move the mobile platform towards any direction and rotate the mobile platform in different directions.

BACKGROUND OF THE INVENTION

In recent years, extensive researches on mobile carriers having wheels and their related control method and mobile capability are conducted, and their applications cover the mobile carriers for handicaps, elderly people or robots, and the carries of this sort are expected to be used extensively in our daily life. In 2007, The Ministry of Economy, Trade and Industry (Japan) decided to reserve a budget of two thousand million yens to subsidize the research and development of new-generation artificial intelligent robots such as police robots and tour-guide robots. To make the robots more practical and achieve the target of commercializing the robots in 2015, the University of Tokyo and seven major corporations started their research programs on robots for the aging population of the society and intended to spend 10 to 15 years to develop a robot that can do housework and expected to develop a robot that can determine and cross a street safely by 2016. The budget of the first three years of the research is up to 8.7 million U.S. dollars, and it is the largest scale of joint research on robot technologies between Japanese universities and the industry. The U.S. National Science Foundation sponsored Carnegie Mellon University and University of Pittsburgh with 1.5 million U.S. dollars to establish the Institute for Quality of Life and develop the household robot technology. The objective of the research program is to apply technologies innovatively to help professionals in different areas and handicaps who need helps in their daily life.

A traditional wheeled carrier such as a wheelchair generally uses the wheels on both left and right sides of the wheelchair to drive the wheelchair, and the differential wheel of turns can be used to control the driving direction. Such method can maintain stable movements easily, and thus is used extensively. However, the method involves a very complicated process to move the carrier sideway and also encounters the problem of making turns. The carrier must be turned to a traveling direction first before reaching the traveling direction towards the destination, and then the carrier is returned to the original direction, and it is obvious that the confirmation of the route becomes very important. As a result, the carriers of this structure only gives two degrees-of-freedom (DOF) which is the simplest control method, and different rotating speeds are provided to the wheels to control the carrier to move forward, make turns and back up. The carrier can be rotated at any point, but it still cannot be moved sideway. If it is necessary to move in an environment with many obstacles and a crowd of people, the movements of the carriers of the sort are limited substantially. Particularly, when the carrier is used in a small home or a crowded public place, the inflexibility of movements will become a major drawback.

Therefore, the present invention intends to find a way of using an omnidirectional movement control system to operate with a mobile platform having omnidirectional wheels, so that the mobile platform can be moved in any direction and rotated in different directions, so as to overcome the shortcomings and the inflexible movement of conventional wheeled carriers.

SUMMARY OF THE INVENTION

In view of the shortcomings of the prior art, the inventor of the present invention based on years of experience in the related industry to conduct researches and experiments, and finally developed an omnidirectional movement control system to operate with a mobile platform having omnidirectional wheels, so that the mobile platform can be moved in any direction and rotated in different directions, so as to enhance the movements of the mobile platform.

Therefore, it is a primary objective of the present invention to provide an omnidirectional movement control system capable of controlling the movements of an omnidirectional mobile platform, so that the mobile platform can be moved in any direction and rotated in different direction. When the mobile platform is moving in an environment with many obstacles and a crowd of people, the mobile platform provide excellent mobility and flexibility.

Another objective of the present invention is to provide an omnidirectional movement control system comprising: a move signal generator, for generating a plurality of movement signals based on a plurality of first position signals and a plurality of second position signals; an omnidirectional movement controller, for generating a plurality of pulse width modulation signals and a plurality of motor direction change signals based on the movement signals and a plurality of motor encoding disc signals, wherein the pulse width modulation signal relates to a plurality of rotating speeds of a motor; and a driving circuit, for driving the motor to rotate the plurality of omnidirectional wheels based on the pulse width modulation signals and the motor direction change signals.

Since the mobile platform has omnidirectional wheels, the mobile platform can be moved in any direction and rotated in different directions, and the present invention can achieve the effect of enhancing the movements of the mobile platform.

The above and other objects, features and advantages of the present invention will become apparent from the following detailed description taken with the accompanying drawing.

DETAILED DESCRIPTION OF THE PREFERRED EMBODIMENTS

To make it easier for our examiner to understand the objective, innovative features and performance of the present invention, we use preferred embodiments and accompanying drawings for a detailed description of the present invention.

Figure 1:
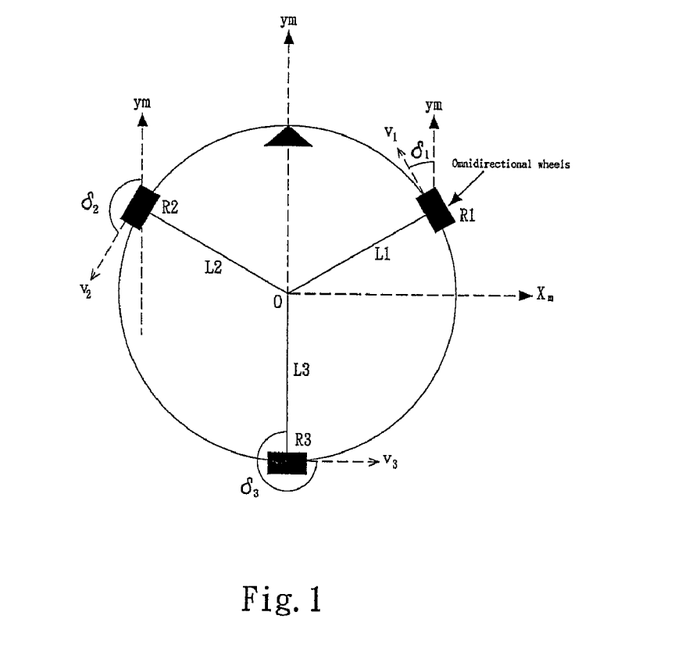
FIG. 1 is a schematic view of the movements of a three-wheel omnidirectional mobile platform of an omnidirectional movement control system in accordance with the present invention.
Figure 2:
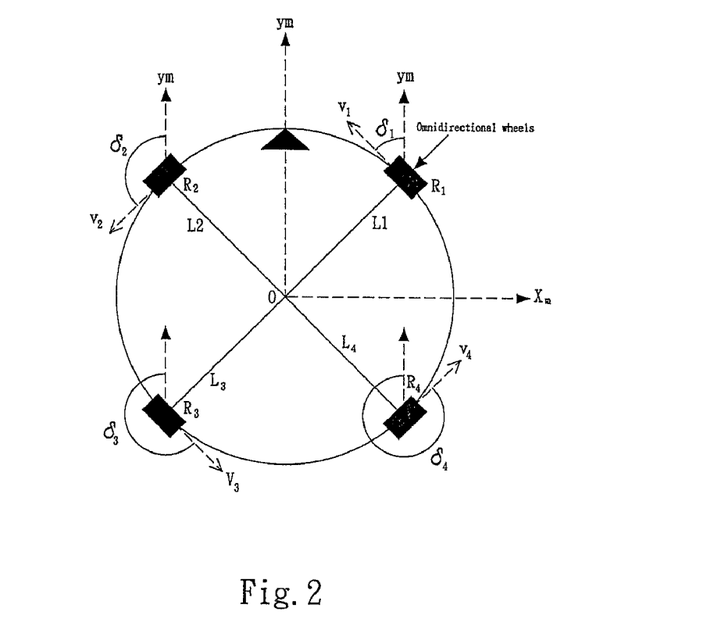
FIG. 2 is a schematic view of the movements of a four-wheel omnidirectional mobile platform of an omnidirectional movement control system in accordance with the present invention.
Figure 3:
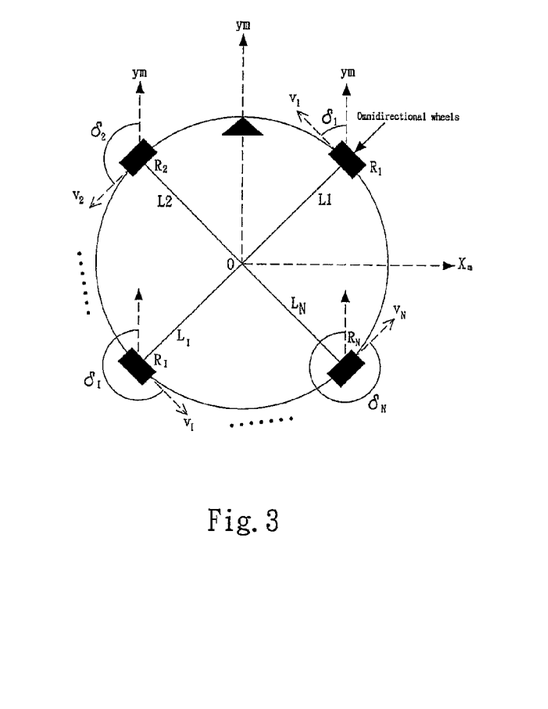
FIG. 3 is a schematic view of the movements of an N-wheel omnidirectional mobile platform of an omnidirectional movement control system in accordance with the present invention.

Referring to FIGS. 1 to 3 for schematic views of an omnidirectional movement control system having an omnidirectional mobile platform with three wheels, four wheels and N wheels respectively, the movements of these mobile platforms are analyzed, and the inverse kinematics equation of the omnidirectional mobile platform with three wheels can be obtained as follows:

$$\begin{bmatrix} v_1 \\ v_2 \\ v_3 \end{bmatrix} = \begin{bmatrix} R_1 \dot{\theta}_1 \\ R_2 \dot{\theta}_2 \\ R_3 \dot{\theta}_3 \end{bmatrix} = \begin{bmatrix} -\sin(\delta_1) & \cos(\delta_1) & L_1 \\ -\sin(\delta_2) & \cos(\delta_2) & L_2 \\ -\sin(\delta_3) & \cos(\delta_3) & L_3 \end{bmatrix} \begin{bmatrix} \dot{x}_m \\ \dot{y}_m \\ \dot{\phi} \end{bmatrix}$$

The inverse kinematics equation of the omnidirectional mobile platform, with four wheels is given as follows:

$$\begin{bmatrix} v_1 \\ v_2 \\ v_3 \\ v_4 \end{bmatrix} = \begin{bmatrix} R_1 \dot{\theta}_1 \\ R_2 \dot{\theta}_2 \\ R_3 \dot{\theta}_3 \\ R_4 \dot{\theta}_4 \end{bmatrix} = \begin{bmatrix} -\sin(\delta_1) & \cos(\delta_1) & L_1 \\ -\sin(\delta_2) & \cos(\delta_2) & L_2 \\ -\sin(\delta_3) & \cos(\delta_3) & L_3 \\ -\sin(\delta_4) & \cos(\delta_4) & L_4 \end{bmatrix} \begin{bmatrix} \dot{x}_m \\ \dot{y}_m \\ \dot{\phi} \end{bmatrix}.$$

The inverse kinematics equation of the omnidirectional mobile platform with N wheels is given as follows:

$$\begin{bmatrix} v_1 \\ v_2 \\ \vdots \\ v_I \\ \vdots \\ v_N \end{bmatrix} = \begin{bmatrix} R_1 \dot{\theta}_1 \\ R_2 \dot{\theta}_2 \\ \vdots \\ R_I \dot{\theta}_I \\ \vdots \\ R_N \dot{\theta}_N \end{bmatrix} = \begin{bmatrix} -\sin(\delta_1) & \cos(\delta_1) & L_1 \\ -\sin(\delta_2) & \cos(\delta_2) & L_2 \\ \vdots & \vdots & \vdots \\ -\sin(\delta_I) & \cos(\delta_I) & L_I \\ \vdots & \vdots & \vdots \\ -\sin(\delta_N) & \cos(\delta_N) & L_N \end{bmatrix} \begin{bmatrix} \dot{x}_m \\ \dot{y}_m \\ \dot{\phi} \end{bmatrix}$$

Where, $v_1 \sim v_N$ is the speed of each omnidirectional wheel; $R_1 \sim R_N$ is the radius of each omnidirectional wheel; $\dot{\theta}_1 \sim \dot{\theta}_N$ is the angular speed of each motor, $\delta_1 \sim \delta_N$ and $L_1 \sim L_N$ are the included angle and length respectively; $\dot{x}_m$, $\dot{y}_m$ and $\dot{\phi}$ represent the velocity components of the right side, the front side and the counterclockwise direction of the omnidirectional mobile platform respectively.

Figure 4:
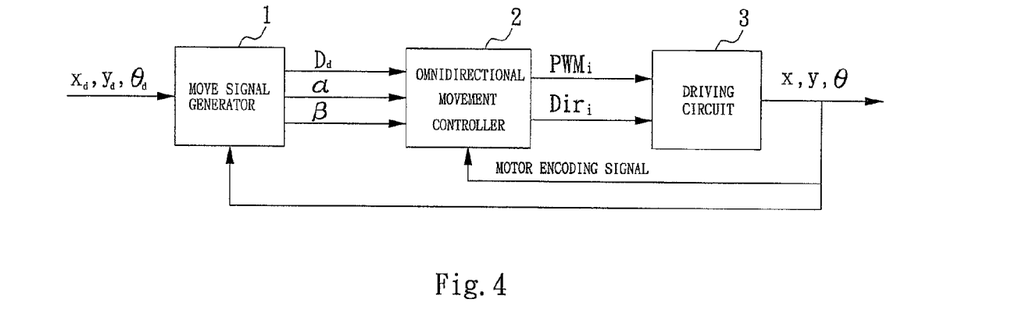
FIG. 4 is a block diagram of a control circuit of a preferred embodiment of the present invention.
Figure 5:
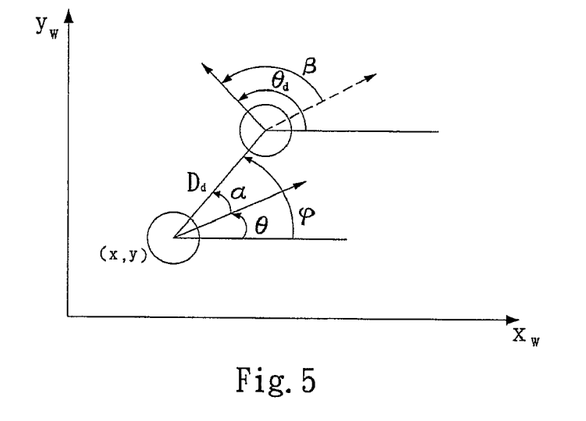
FIG. 5 illustrates the relation between a mobile platform and a target point of a preferred embodiment of the present invention.

Referring to FIGS. 4 and 5 for a block diagram of a control circuit and a relation between a mobile platform and a target point in accordance with a preferred embodiment of the present invention, an omnidirectional movement control system comprises: a move signal generator 1 (including but not limited to a single-chip processor), for generating a plurality of movement signals (such as a plurality of relative distance signals $D_d$, a plurality of relative angle signals α and a plurality of face angle signals β) based on a plurality of first position signals (such as the position and angle $(x_d, y_d, \theta_d)$ of the mobile platform at a particular moment) and a plurality of second position signals (such as the position and angle (x, y, θ) of the destination), wherein the omnidirectional movement control system further comprises a signal capturing device (not shown in the figure) (including but not limited to a remote signal receiver, a camera, at least one sensor or a touch screen), for generating the second position signals (x, y, θ), and the first position signals $(x_d, y_d, \theta_d)$ can be generated by the remote signal receiver, the camera, the sensor or the touch screen; an omnidirectional movement controller 2 (including but not limited to a single-chip processor), for generating a plurality of pulse width modulation signals $PWM_i$ and a plurality of motor direction change signals $Dir_i$ based on the movement signals and a plurality of motor encoding disc signals, wherein the pulse width modulation signals $PWM_i$ relate to a plurality of rotating speeds of a motor (not shown in the figure), and a plurality of motor encoding discs (not shown in the figure) is provided for retrieving the actual rotating speed and the rotating direction information of each motor to generate a motor encoding disc signal, and the first position signals $(x_d, y_d, \theta_d)$ can be generated by each motor encoding disc (not shown in the figure); and a driving circuit 3 (including but not limited to a single-chip processor, at least one IC, at least one resistor or at least one capacitor), for driving the motors (not shown in the figure) to rotate a plurality of omnidirectional wheels (not shown in the figure) based on the pulse width modulation signals $PWM_i$ and the motor direction change signals $Dir_i$. The foregoing omnidirectional movement control system further comprises a carrier (including but not limited to a platform or a wheelchair, and not shown in the figure) for carrying a signal capturing device (not shown in the figure), and the omnidirectional movement control system can be integrated into a single-chip processor (not shown in the figure) to improve the overall performance.

Figure 6:
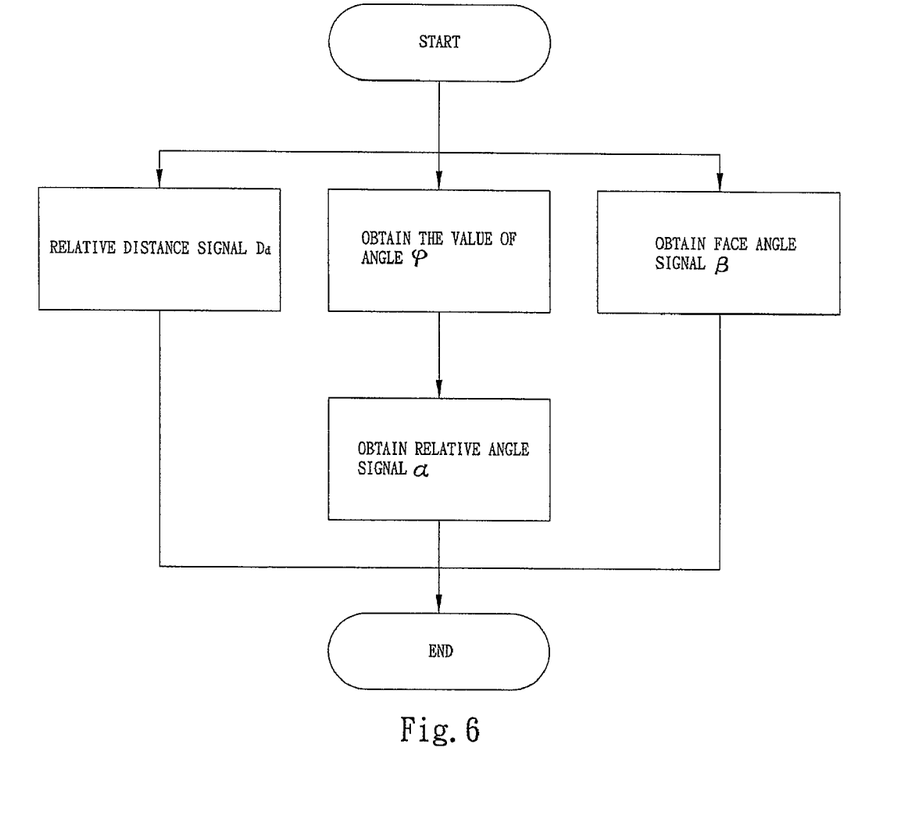
FIG. 6 is a flow chart of generating a movement signal by a move signal generator of a preferred embodiment of the present invention.

Referring to FIG. 6 for a flow chart of generating a movement signal of a move signal generator in accordance with a preferred embodiment of the present invention, and also referring to FIGS. 4 and 5 at the same time, after the move signal generator 1 receives the first position signals ($x_d$, $y_d$, $\theta_d$) and the second position signals (x, y, $\theta$), the following equations can be used to obtain a plurality of relative distance signals $D_d$, a plurality of relative angle signals $\alpha$ and a plurality of face angle signals $\beta$, wherein the relative angle signal $\alpha$ is obtained by the value of an angle $\phi$:

$$D_d = \sqrt{(x_d - x)^2 + (y_d - y)^2}$$

$$\varphi = \begin{cases} \tan^{-1}\dfrac{y_d - y}{x_d - x}, & \text{if } y_d - y \geq 0 \text{ and } x_d - x > 0 \\ 180° + \tan^{-1}\dfrac{y_d - y}{x_d - x}, & \text{if } y_d - y \geq 0 \text{ and } x_d - x < 0 \\ 180° + \tan^{-1}\dfrac{y_d - y}{x_d - x}, & \text{if } y_d - y \leq 0 \text{ and } x_d - x > 0 \\ 360° + \tan^{-1}\dfrac{y_d - y}{x_d - x}, & \text{if } y_d - y \leq 0 \text{ and } x_d - x < 0 \end{cases}$$

$$\alpha = \begin{cases} \varphi - \theta, & \text{if } \varphi - 180° < \theta < 180° \\ (\varphi - \theta) - 360°, & \text{if } -180° < \theta < \varphi - 180° \end{cases}$$

$$\beta = \begin{cases} (\theta_d - \theta) + 360°, & \text{if } \theta_d - \theta < -180° \\ \theta_d - \theta, & \text{if } -180° \leq \theta_d - \theta \leq 180° \\ (\theta_d - \theta) - 360°, & \text{if } 180° < \theta_d - \theta \end{cases}$$

Figure 7:
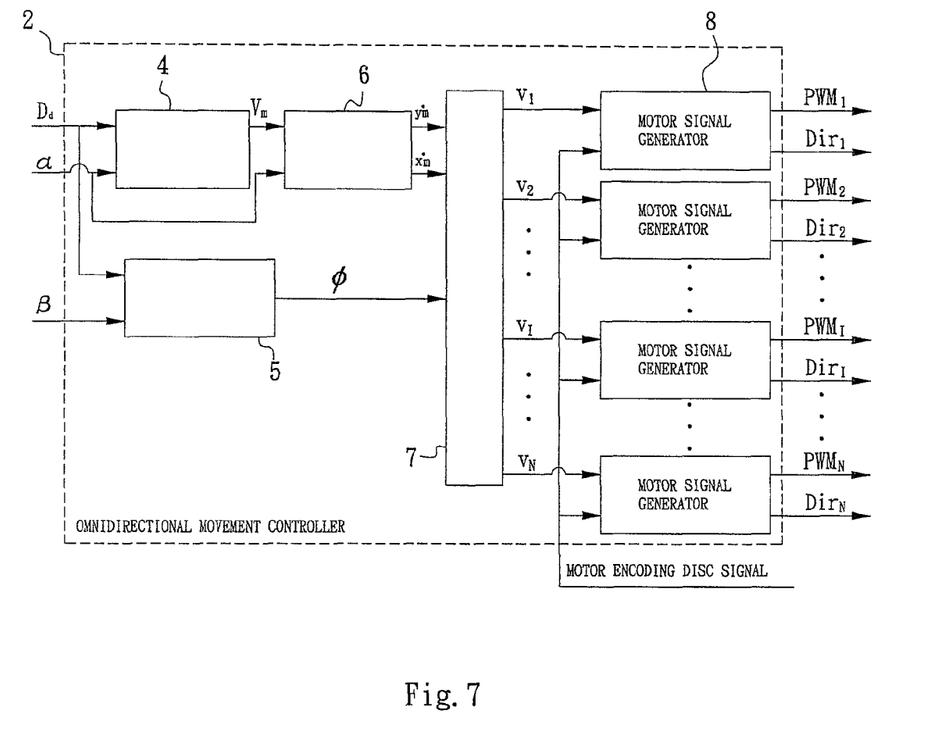
FIG. 7 is a circuit block diagram of an omnidirectional movement controller of a preferred embodiment of the present invention.
Figure 8:
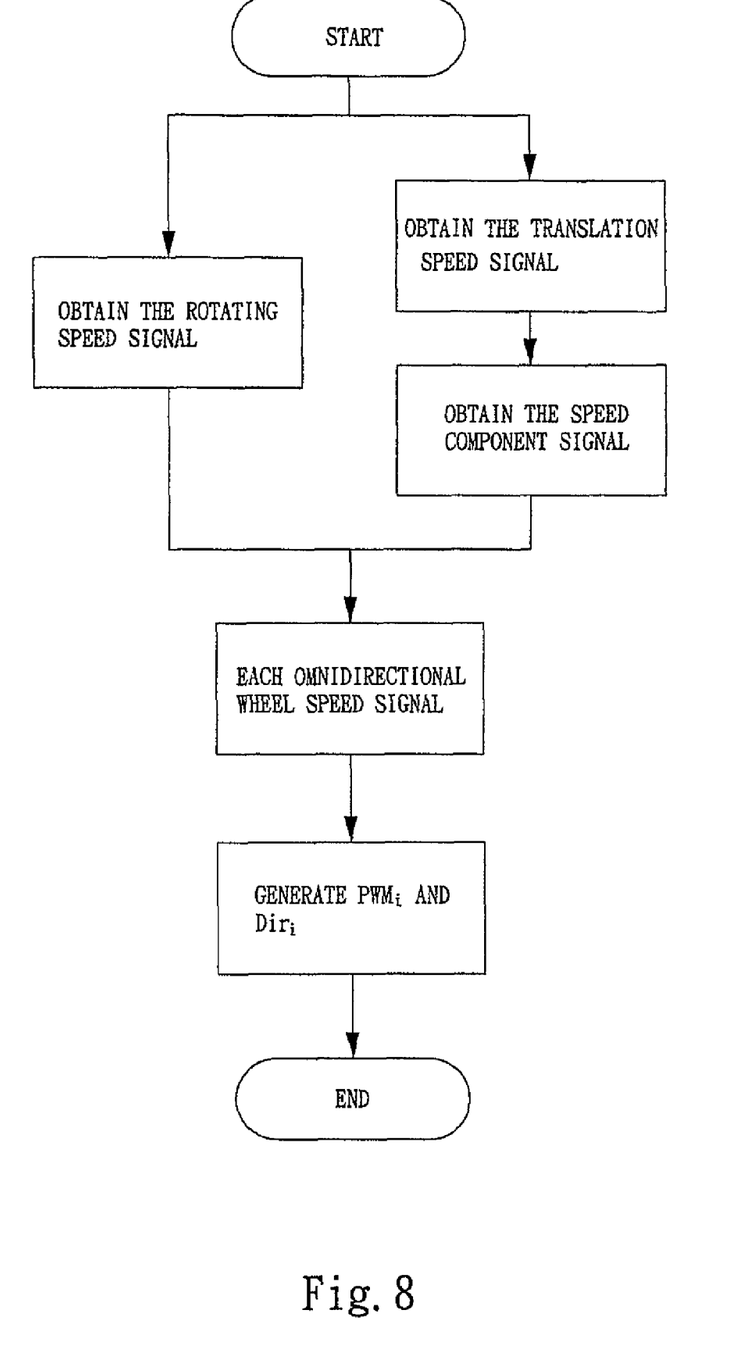
FIG. 8 is a flow chart of a computation made by an omnidirectional movement controller in accordance with a preferred embodiment of the present invention.

Referring to FIGS. 7 and 8 for a circuit block diagram and a flow chart of a computation made by an omnidirectional movement controller in accordance with a preferred embodiment of the present invention and also referring to FIGS. 4 to 6 at the same time, an omnidirectional movement controller 2 comprises: a translation speed generator 4, for generating a plurality of translation speed signals $v_m$ based on the relative distance signals $D_d$ and the face angle signals $\beta$; a rotating speed generator 5, for generating a plurality of rotating speed signals $\dot{\phi}$ based on the relative distance signals $D_d$ and the relative angle signals $\alpha$; a two-dimensional speed generator 6, for generating a plurality of speed component signals $\dot{x}_m$, $\dot{y}_m$ based on the translation speed signals $v_m$ and the relative angle signals $\alpha$; an omnidirectional wheel speed converter 7, for generating a plurality of omnidirectional wheel speed signals $v_1 \sim v_N$ based on the speed component signals $\dot{x}_m$, $\dot{y}_m$ and the rotating speed signals $\dot{\phi}$; and a plurality of motor signal generators 8, for generating the pulse width modulation signals $PWM_i$ and the motor direction change signals $Dir_i$ based on each omnidirectional wheel speed signal $v_1 \sim v_N$ and each motor encoding disc signal corresponding to the motor signal generator 8.

Figure 9:
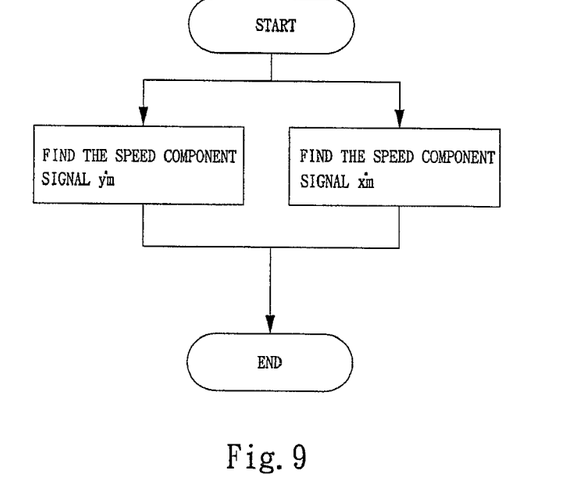
FIG. 9 is a flow chart of a computation made by two-dimensional speed generators in accordance with a preferred embodiment of the present invention.

Referring to FIG. 9 for a flow chart of a computation made by a two-dimensional speed generator in accordance with a preferred embodiment of the present invention, the two-dimensional speed generator (not shown in the figure) generates a plurality of speed component signals $\dot{x}_m$, $\dot{y}_m$ based on the translation speed signals $v_m$ and the relative angle signals $\alpha$, and its related equations are given below:

$$\dot{x}_m = -v_m \sin(\alpha)$$

$$\dot{y}_m = v_m \cos(\alpha)$$

Figure 10:
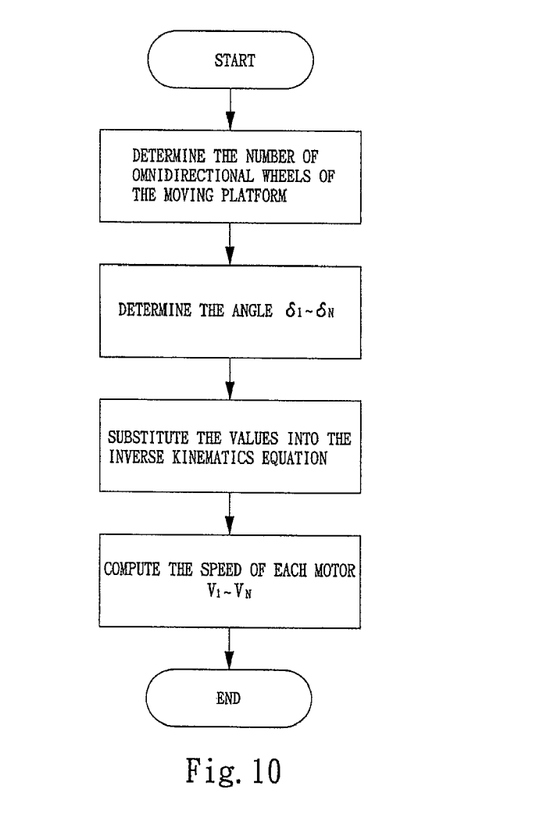
FIG. 10 is a flow chart of a computation made by an omnidirectional wheel speed converter in accordance with a preferred embodiment of the present invention.

Referring to FIG. 10 for a flow chart of a computation made by an omnidirectional wheel speed converter in accordance with a preferred embodiment of the present invention and also referring to FIGS. 1 to 3 and 10 at the same time, the omnidirectional wheel speed converter (not shown in the figure) determines the number of omnidirectional wheels of the mobile platform based on the motor encoding disc signal, and then determine the angles $\delta_1 \sim \delta_N$ based on the number of the omnidirectional wheels, and finally substitute these values into the aforementioned inverse kinematics equations to obtain the omnidirectional wheel speed signals $v_1 \sim v_N$.

Figure 11:
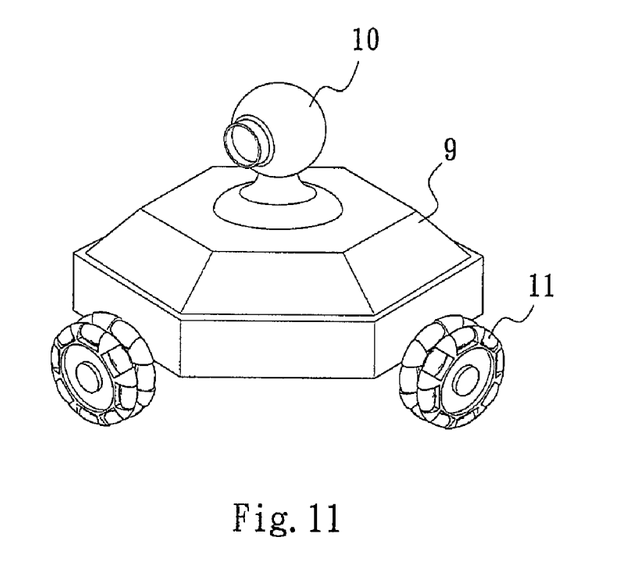
FIG. 11 is a perspective view of a mobile platform of an omnidirectional movement control system in accordance with a preferred embodiment of the present invention.

Referring to FIG. 11 for a perspective view of a mobile platform of an omnidirectional movement control system in accordance with a preferred embodiment of the present invention, the omnidirectional movement control system uses a platform 9 to carry a camera 10 to generate the second position signals (x, y, $\theta$) and the first position signals ($x_d$, $y_d$, $\theta_d$), and control the three omnidirectional wheels 9 to move towards the destination.

Figure 12:
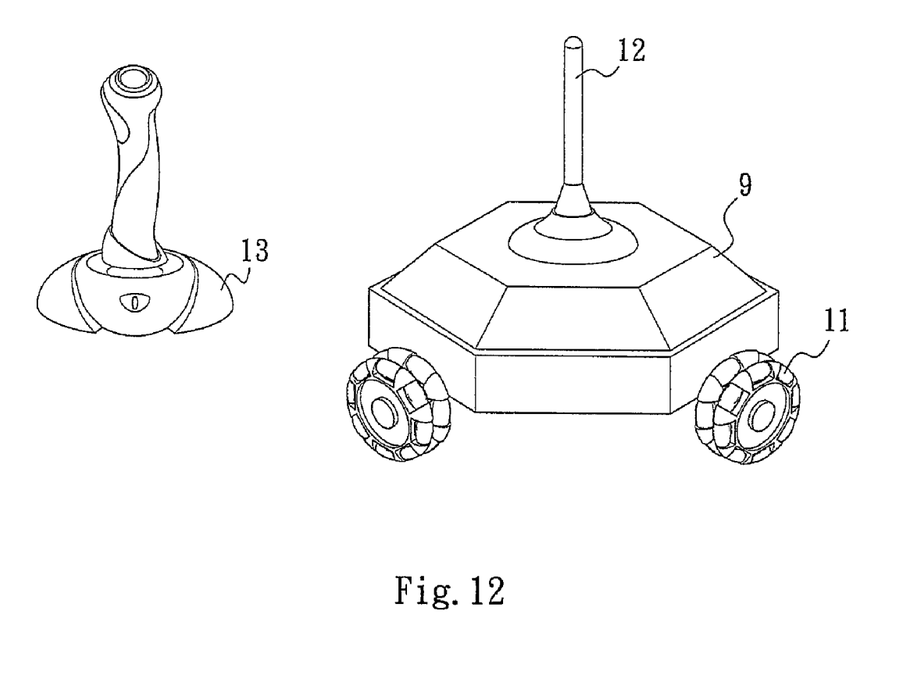
FIG. 12 is a perspective view of a mobile platform of an omnidirectional movement control system in accordance with another preferred embodiment of the present invention.

Referring to FIG. 12 for a perspective view of a mobile platform of an omnidirectional movement control system in accordance with another preferred embodiment of the present invention, the omnidirectional movement control system uses a platform 9 to carry a remote signal receiver 12 and a remote control device 13 to generate the second position signals (x, y, $\theta$) and the first position signals ($x_d$, $y_d$, $\theta_d$), and control the three omnidirectional wheels 11 to move towards the destination.

Figure 13:
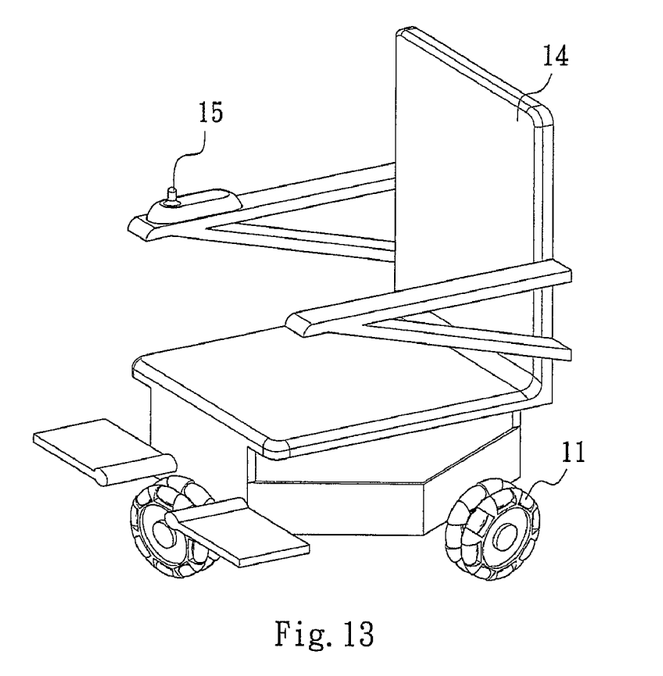
FIG. 13 is a perspective view of a mobile platform of an omnidirectional movement control system in accordance with a further preferred embodiment of the present invention.

Referring to FIG. 13 for a perspective view of a mobile platform of an omnidirectional movement control system in accordance with a further preferred embodiment of the present invention, the omnidirectional movement control system has a wheelchair 14 and uses a controller 15 to generate the second position signals (x, y, $\theta$) and the first position signals ($x_d$, $y_d$, $\theta_d$), and controls the three omnidirectional wheels 11 to move towards the destination.

Figure 14:
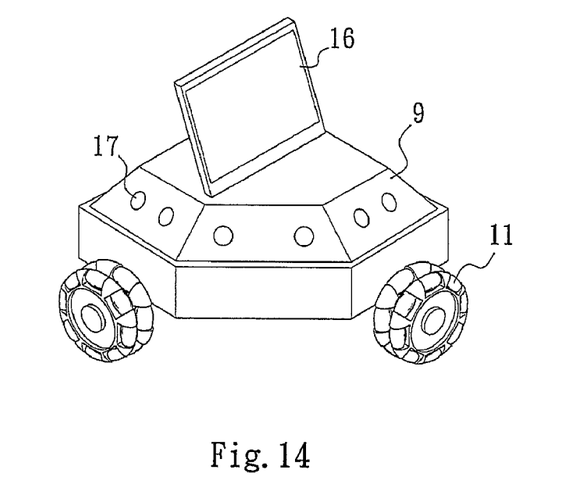
FIG. 14 is a perspective view of a mobile platform of an omnidirectional movement control system in accordance with another further preferred embodiment of the present invention.

Referring to FIG. 14 for a perspective view of a mobile platform of an omnidirectional movement control system in accordance with another further preferred embodiment of the present invention, the omnidirectional movement control system uses a platform 9 to carry a touch screen 16 and at least one sensor 17 to generate the second position signals (x, y, $\theta$) and the first position signals ($x_d$, $y_d$, $\theta_d$), and control three omnidirectional wheels 11 to move towards the destination.

In summation of the description above, the present invention herein enhances the performance than the conventional structure and further complies with the patent application requirements. The invention adopts an omnidirectional movement controller to work with a mobile platform having omnidirectional wheels, so that the mobile platform can be moved in any direction and rotated in different directions, so as to enhance the movements of the mobile platform, and such design is very useful to the industry and the products so manufactured can fully satisfy the current market requirements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An omnidirectional movement control system comprising:
   a move signal generator, for generating a plurality of movement signals by a plurality of first position signals and a plurality of second position signals;
   an omnidirectional movement controller, for generating a plurality of pulse width modulation signals and a plurality of motor direction change signals by said movement signals and a plurality of motor encoding disc signals, wherein said plurality of pulse width modulation signals relates to a plurality of rotating speeds of said motors, further wherein the plurality of pulse width modulation signals are in a same direction in at least one of a linear direction and an angular direction; and a driving circuit, for driving said motors to rotate said plurality of omnidirectional wheels in said angular direction by said pulse width modulation signals and said motor direction change signals.

2. The omnidirectional movement control system of claim 1, wherein said movement signals comprise a plurality of relative distance signals, a plurality of relative angle signals and a plurality of face angle signals.

3. The omnidirectional movement control system of claim 2, wherein said omnidirectional movement controller comprises:
- a translation speed generator, for generating a plurality of translation speed signals by said relative distance signals and said relative angle signals;
- a two-dimensional speed generator, for generating a plurality of speed component signals by said translation speed signals and said relative angle signals;
- an omnidirectional wheel speed converter, for generating a plurality of omnidirectional wheel speed signals by said speed component signals and said rotating speed signals; and
- a plurality of motor signal generators, for generating said pulse width modulation signals and said motor direction change signals by said each omnidirectional wheel speed signal and said each motor encoding disc signal of each corresponding motor signal generator.

4. The omnidirectional movement control system of claim 1, wherein said motor encoding disc signals are generated by an actual rotating speed and a direction change information of said each motor captured by said plurality of motor encoding discs.

5. The omnidirectional movement control system of claim 4, wherein said first position signals are generated by said motor encoding discs.

6. The omnidirectional movement control system of claim 1, wherein said omnidirectional movement control system further comprises a signal capturing device for generating said second position signals.

7. The omnidirectional movement control system of claim 6, wherein said signal capturing device is at least one of a remote signal receiver, a camera, at least one sensor or a touch screen.

8. The omnidirectional movement control system of claim 7, wherein said first position signals are generated separately by at least one of said remote signal receiver, said camera, said sensor or said touch screen.

9. The omnidirectional movement control system of claim 6, wherein said omnidirectional movement control system further comprises a carrier for carrying said signal capturing device.

10. The omnidirectional movement control system of claim 9, wherein said carrier is a platform.

11. The omnidirectional movement control system of claim 9, wherein said carrier is a wheelchair.

12. The omnidirectional movement control system of claim 1, wherein said move signal generator is a single-chip processor.

13. The omnidirectional movement control system of claim 1, wherein said omnidirectional movement controller is a single-chip processor.

14. The omnidirectional movement control system of claim 1, wherein said driving circuit is a single-chip processor.

15. The omnidirectional movement control system of claim 1, wherein said driving circuit is comprised of at least one of at least one IC, at least one resistor or at least one capacitor.

16. The omnidirectional movement control system of claim 1, wherein said omnidirectional movement control system is integrated into a single-chip processor.

* * * * *